June 27, 1950   I. P. PESCATORI   2,512,837
EDUCATIONAL DEVICE
Filed March 19, 1946   2 Sheets-Sheet 1

Inventor
Igino P. Pescatori,

By

Attorneys

June 27, 1950     I. P. PESCATORI     2,512,837
EDUCATIONAL DEVICE
Filed March 19, 1946     2 Sheets-Sheet 2
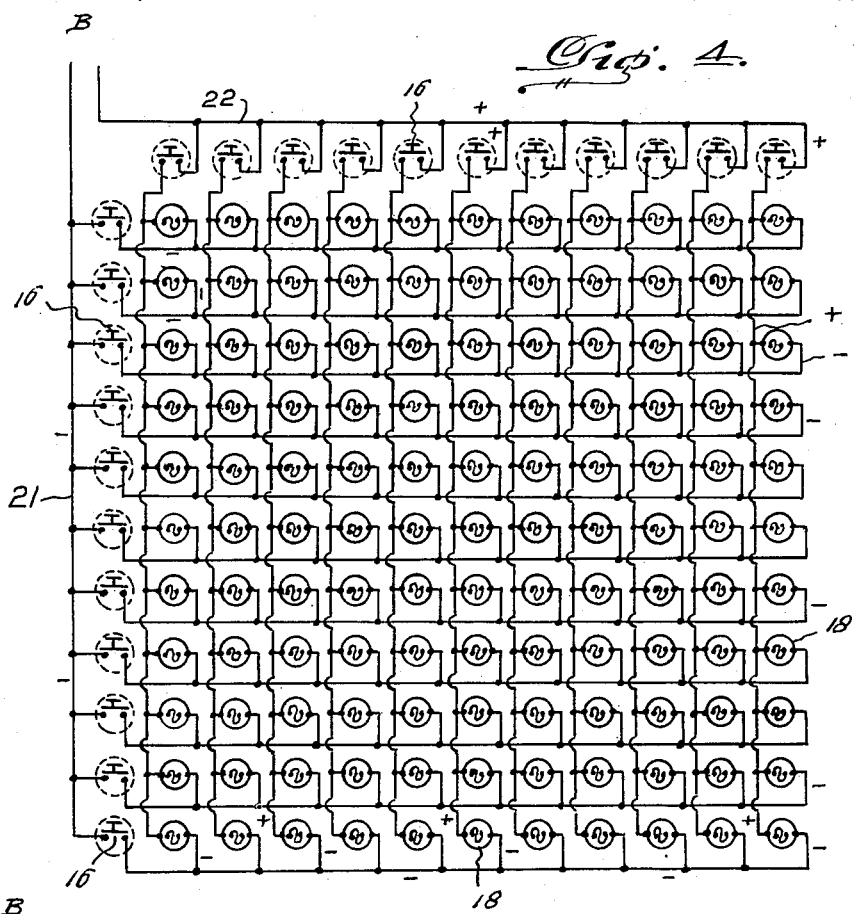
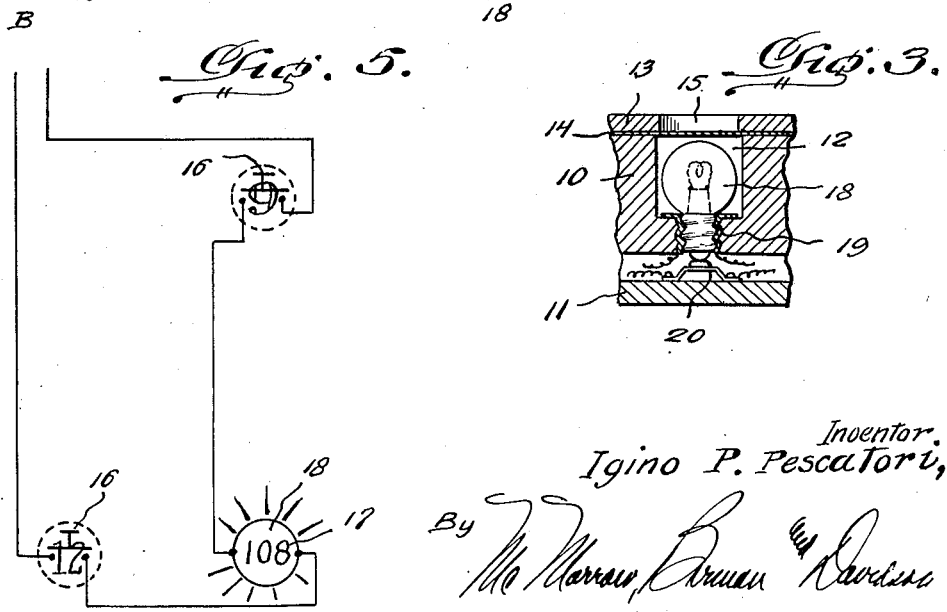
Inventor.
Igino P. Pescatori,
By
Attorneys Patented June 27, 1950

2,512,837

UNITED STATES PATENT OFFICE 2,512,837

EDUCATIONAL DEVICE

Igino P. Pescatori, St. Albans, N. Y.

Application March 19, 1946, Serial No. 655,561

2 Claims. (Cl. 35—31)

The present invention relates broadly to educational devices and is more particularly concerned with a board equipped with visual signals operated by simple electro-mechanical means to reflect true answers to ordinary questions in multiplication tables.

The primary object of the invention is to produce a board of the character referred to which can be employed for educational and amusement purposes, for children and adults.

Another object of the invention is to provide a device of the character referred to which is simply constructed and assembled in various sizes for desk or wall use as an educational medium and one which will hold the attention of pupils by arousing their interest.

A further object of the invention is to provide a simple educational board which can be readily manipulated by young children.

With the foregoing and other objects and advantages in view the invention consists of the novel construction and arrangement of parts hereinafter described and claimed.

In the accompanying drawings illustrating the preferred embodiment of the invention:

Figure 3 is a fragmentary vertical section through the board showing one of the signal orifices.

Figure 4 is a wiring plan of the board.

Figure 5 is a schematic plan of wiring to illustrate the operation of the board as applied to a certain question in multiplication.

Like numerals, as used in the description and drawings, designate the same parts of construction.

Figure 1:
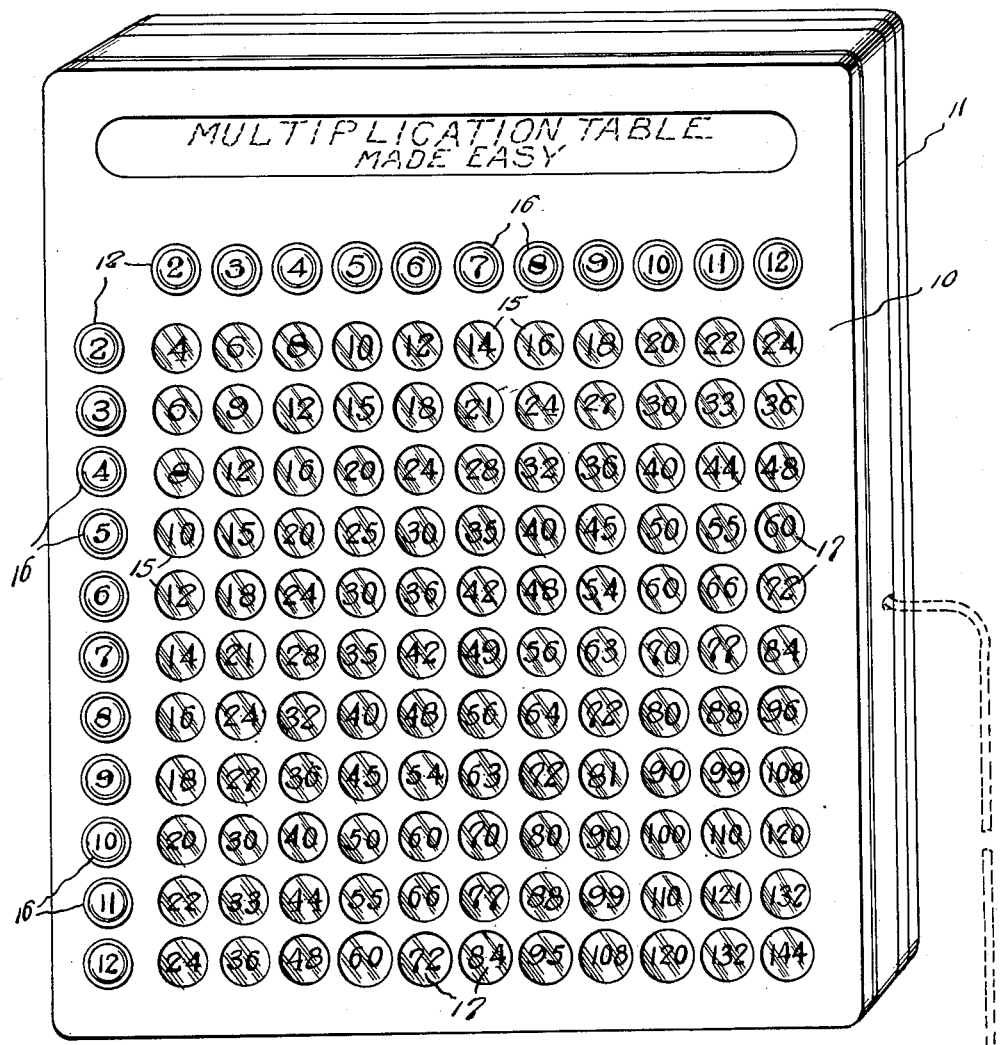
Figure 1 is a perspective view of the device.
Figure 2:
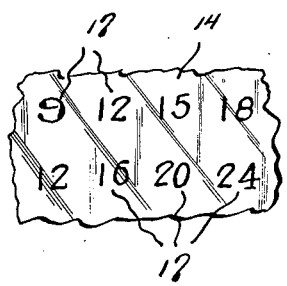
Figure 2 is a fragmentary view of a transparency which lies between the signal lamps and orifices of the board and has numerals provided thereon in a predetermined arrangement.

The device here shown is primarily designed for desk use and is of an easily portable size and weight. Its shape may be as desired but is illustrated as rectangular. Larger sizes of a semiportable or fixed character may be provided, if desired. The devices may be powered by an electric circuit of 110 or more volts connected to a wall socket by conventional means or may be energized from a suitable storage battery such as a conventional dry cell battery.

The device consists of a board 10 and back 11, hinged or otherwise attached together to form a case. The device illustrated is designed to indicate the products of multiplication of any two numbers from two to twelve and has a plurality of apertures 12 arranged in twelve vertical columns and a like number of horizontal rows.

Superimposed on one side of the board 10 is a transparency 14 which may be constructed of laminations of cardboard, or other suitable material 13 having apertures therein corresponding with the apertures 12 in board 10, and a sheet of tracing cloth 14, secured to the cardboard laminations 13 and having numerals 17 thereon.

The first column of apertures at the left-hand side of the board and the top row are set apart somewhat from the others and reserved for two series of push button switches 16, each button bearing an imprinted numeral from 2 to 12 thereon. In multiplication tests these two rows contain the multipliers and multiplicands while all other rows on the board are reserved for the product numbers 17 obtained by the pupil operating a multiplier button together with a multiplicand button.

On the tracing cloth are printed numerals positioned to register with the "products" orifices and beneath same are small flash-light bulbs 18 seated in sockets 19 contained in the orifices 12. These visual signals are powered by a connector cord or battery as indicated above, and the circuit is normally open.

The numerals in the "products" columns are not arranged in sequence but are set up in a definite pattern related to the various push button combinations. The first "products" column, which is aligned with both buttons marked 2, begins with the numeral 4 and progresses to 24 with a differential of 2 between the numbers and the same is true with regard to the first row across which begins with 4 and ends with 24.

The numerals of the succeeding rows and columns reading either down or across, increase from 3 in the second succeeding row and column to 12 in the last ones, thus arriving at a maximum product number of 144 from either direction.

All of the push buttons are set in templates and control the electric bulb circuits.

The wiring for the signal lamps, including the push button switches, is installed on the inner wall of the back 11, and the circuit may include a suitable battery or a cord and plug may be connected to the circuit for power, as indicated by dotted lines at P in Figure 1.

Referring to Figure 4, the circuit wiring is arranged as follows. A main wire or buss 21 extends from one side of the power source B along the left-hand side of the under-surface of board 10 and is connected to one side of all of the push button switches 16 in the first vertical column at the left-hand side of the board. A second main wire or buss 22 extends across the top of the board and is connected to one side of each push button switch in the top row. The push button switches may be considered as divided into two groups, the first group including the switches in the top horizontal row, and the second group, the switches in the first left-hand vertical column.

A lamp bulb socket 19 is secured in the inner end of each aperture 12 of board 10 from the left-hand column and the top row of apertures in which the push button switches 16 are mounted, to receive respective light bulbs 18. Each of the light bulb sockets is connected to one of the main wires 21 or 22. In the illustrated embodiment each horizontal row of sockets is connected to main wire 21 through respective push button switches 16 of the left-hand vertical row of switches.

A plurality of bulb contact terminals 20 are secured to the back 11 and disposed one under each bulb socket 19. These contact terminals are connected to main wire 22, each vertical row of terminals being connected to wire 22 through a respective push button switch 16 in the top horizontal row of push button switches.

Each lamp under a product number is thus connected between two push buttons, one representing the multiplicand and the other the multiplier, in series with them and the source of electricity, as shown in Figure 5 which is typical.

In Figure 5 the question proposed is how much is 12×9 and the answer is 108, as determined by pushing down the two buttons 12 and 9, the circuit to obtain which is illustrated in the diagram therefor. When the two buttons are pushed the bulb under the product number 108 will light, thus visualizing the result. Various questions can thus be answered correctly when the multipliers and multiplicands are stated.

Stated in somewhat different terms, the operative portion of the multiplication board constitutes a major rectangle, the top side of which comprises the top horizontal row of push button switches and the left-hand side of which comprises the left-hand vertical column of push button switches. The top row of switches is consecutively numbered from 2 to 12 beginning at the left-hand end and the vertical row of switches is similarly numbered beginning at the top. If we now extend a theoretical line vertically downward from one of the top row switches and a theoretical horizontal line to the right from one of the left-hand vertical column switches, these two lines will always intersect and enclose a rectangular space between themselves and the top and left-hand side of the major rectangle. The two switches from which the theoretical lines extend are located at diagonally-opposed corners of the enclosed rectangle, namely, the lower left-hand, and the upper-right-hand corner. A signal light is located at the lower-right-hand corner of the rectangle and over this signal light the transparency carries a number which is the product of the numbers on the two push button switches under consideration. Since a conductor extends vertically from the contact terminal of the signal light to the top row switch, a conductor extends horizontally from the bulb socket of the signal light to the left-hand vertical-column switch and since the top row switches and vertical column switches are connected to opposite sides of the power source, the appropriate light at the lower-right-hand corner of the rectangular space subtended by any switch in the vertical column and any switch in the horizontal row, that is, the light located at the intersection of the corresponding horizontal row and vertical column, will be lighted and will illuminate a number which is always the product of the numbers on the two operated switches.

As different embodiments may be made of this inventive concept and modifications may be made in the embodiment hereinbefore shown and described, it will be understood that the matter herein is to be interpreted as illustrative merely, and not in a limiting sense.

What I claim is:

1. An electrically illuminated multiplication table comprising a board including a rectangular area and having within said area a plurality of apertures arranged in horizontal rows and vertical columns; a first group of push button switches disposed one in each aperture of a horizontal row of apertures at one side of said rectangular area, said first group of push button switches being consecutively numbered and collectively connected with one side of a source of electrical energy; a second group of push button switches disposed one in each aperture of a vertical row of apertures at one side of said rectangular area, said second group of push button switches being consecutively numbered and collectively connected with the opposite side of said source of electrical energy; a signal light in each of the remaining apertures in said board, each light comprising a light bulb, a bulb socket and a bulb contact terminal; electrical conductors each connecting all of the bulb sockets in a respective vertical column of signal lights with a respective push button switch of said first group; other electrical conductors each connecting all of the bulb contact terminals of a respective horizontal row of signal lights with a respective push button switch of said second group, whereby upon operation of a switch of said first group and a switch of said second group a signal light at the intersection of the corresponding vertical column and horizontal row will be illuminated; and a transparency covering the signal light receiving apertures in said board, said transparency having thereon numbers illuminated by said signal lights, each of said numbers representing the product of the numbers on the operated push button switches of the first and second groups located at the ends of the vertical column and horizontal row which intersect at the location of any signal light.

2. An electrically illuminated multiplication table comprising a board including a rectangular area and having within said area a plurality of apertures arranged in intersecting horizontal rows and vertical columns, a first group of push button switches disposed one in each aperture of a horizontal row at one side of said rectangular area; a second group of push button switches disposed one in each aperture of a vertical column of apertures at one side of said rectangular area, the push buttons of said first group being consecutively numbered and collectively connected to one side of a source of electrical energy and the push button switches of the second group being consecutively numbered and collectively connected to the opposite side of said source of electrical energy; a plurality of signal lights disposed one in each remaining aperture in said board; electrical conductors so connecting said signal lights to the push button switches of said first and second groups that when any one push button switch of each group is closed, a predetermined signal light will be illuminated; and transparent means having indicia thereon rendered visible by illumination of said signal light and bearing a predetermined relationship to various combinations of two push button switches disposed one in each of said groups.

IGINO P. PESCATORI.

REFERENCES CITED

The following references are of record in the file of this patent:

UNITED STATES PATENTS

| Number | Name | Date |
|---|---|---|
| 1,400,887 | Liebman | Dec. 20, 1921 |
| 1,617,272 | Peterson | Feb. 8, 1927 |
| 1,618,952 | Mayers | Feb. 22, 1927 |
| 2,085,881 | Van Doren | July 6, 1937 |
| 2,198,894 | Werner | Apr. 30, 1940 |

FOREIGN PATENTS

| Number | Country | Date |
|---|---|---|
| 350,920 | Italy | July 26, 1937 |
| 381,787 | Germany | Sept. 24, 1923 |
| 459,863 | France | 1913 |